US006823254B2

(12) United States Patent
Faymon et al.

(10) Patent No.: US 6,823,254 B2
(45) Date of Patent: Nov. 23, 2004

(54) METHOD AND SYSTEM FOR TURBOMACHINERY SURGE DETECTION

(75) Inventors: David K. Faymon, Phoenix, AZ (US); Darrell C. Mays, Lakewood, CA (US); Yufei Xiong, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 17 days.

(21) Appl. No.: 10/402,210

(22) Filed: Mar. 28, 2003

(65) Prior Publication Data

US 2004/0193355 A1 Sep. 30, 2004

(51) Int. Cl.[7] ........ G06F 11/00
(52) U.S. Cl. ........ 701/100; 701/29
(58) Field of Search ........ 701/1, 29, 36, 701/99, 100, 101; 340/439; 702/183; 73/116, 118.1

(56) References Cited

U.S. PATENT DOCUMENTS 5,726,891 A * 3/1998 Sisson et al. ........ 701/100
5,798,941 A * 8/1998 McLeister ........ 700/282
5,857,321 A * 1/1999 Rajamani et al. ........ 60/39.27
5,908,462 A * 6/1999 Batson ........ 701/100
6,059,522 A * 5/2000 Gertz et al. ........ 415/1
6,231,306 B1 * 5/2001 Khalid ........ 416/26
6,498,978 B2 * 12/2002 Leamy et al. ........ 701/100

* cited by examiner

*Primary Examiner*—Richard M. Camby
(74) *Attorney, Agent, or Firm*—Robert Desmond, Esq.

(57) ABSTRACT

A method and system for surge detection within a gas turbine engine, comprises: measuring the compressor discharge pressure (CDP) of the gas turbine over a period of time; determining a time derivative ($CDP_D$ ) of the measured (CDP) correcting the $CDP_D$ for altitude, ($CDP_{DCOR}$); estimating a short-term average of $CDP_{DCOR}{}^2$; estimating a short-term average of $CDP_{DCOR}$; and determining a short-term variance of corrected CDP rate of change ($CDP_{roc}$) based upon the short-term average of $CDP_{DCOR}$ and the short-term average of $CDP_{DCOR}{}^2$. The method and system then compares the short-term variance of corrected CDP rate of change with a pre-determined threshold ($CDP_{proc}$) and signals an output when $CDP_{roc}>CDP_{proc}$. The method and system provides a signal of a surge within the gas turbine engine when $CDP_{roc}$ remains>$CDP_{proc}$ for pre-determined period of time.

32 Claims, 5 Drawing Sheets

METHOD AND SYSTEM FOR TURBOMACHINERY SURGE DETECTION

GOVERNMENT RIGHTS

This invention was made with Government support under Contract No. DE-FC02-97EE50470 awarded by the Department of Energy. The U.S. Government has certain rights in this invention.

BACKGROUND OF THE INVENTION

The present invention generally relates to methods and systems for surge detection during the operation of turbomachinery. More specifically, the present invention relates to methods and systems for surge detection during the operation of a gas turbine engine by monitoring the short-term variance of altitude-corrected compressor discharge pressure rate of change.

Turbomachinery, such as gas turbine engines, APUs and certain types of compressors can experience an undesirable operating condition called surge or stall. Surge typically occurs when a compression stage airflow and pressure become mismatched, i.e., not enough airflow for a given pressure ratio (exit pressure/inlet pressure) or too much pressure ratio for a given airflow. Surge disrupts the operation,of the turbomachine. Characteristics of a single pop surge include rapid drops in compressor discharge pressure (CDP), followed by a rapid recovery of CDP. Severe surge events are multiple pop or locked-in surge, where CDP repeatedly falls and recovers, then falls again and recovers, on and on, at rates up to 10 or more times per second. Surge typically causes a momentary or sustained loss of power and can cause mechanical damage to the turbomachinery.

Many turbomachinery control systems attempt to either anticipate an impending surge and initiate corrective action, or detect the initial stages of a current surge condition and take corrective action. Many of the available turbomachinery control systems have limitations such as frequent occurrence of false alarms, measurement of multiple parameters and use various additional components.

U.S. Pat. No. 6,231,306 to Khalid (the '306 patent) discloses a control system for preventing a compressor stall in a gas turbine engine. The '306 patent discusses a control system which attempts to detect an impending surge condition in a gas turbine engine and initiates corrective action. The control system of the '306 patent monitors a normalized magnitude of compressor static pressure fluctuations in a frequency band determined by engine speed In order to detect an impending surge condition. The control system of the '306 patent utilizes a signal indicative of the amplified low-pressure compressor disturbances in order to predict an impending surge condition.

U.S. Pat. No. 6,059,522 to Gertz et al. (the '522 patent) discloses techniques for diagnosing and avoiding stall In rotary compressors such as aircraft jet engines. The '522 patent discusses the use of a control system that measures compressor flow characteristics by placing one or more pressure sensors in the compressor flow pattern, monitoring the magnitude of compressor pressure fluctuations in a frequency range determined by engine speed. The resultant magnitude signals are compared to known values for the compressor in order to indicate stall susceptibility.

U.S. Pat. No. 5,726,891 to Sisson et al. (the '891 patent) discloses a control system for detecting an occurrence of surge in a gas turbine engine. The method of the '891 patent obtains filtered derivatives of engine operating characteristics, principally fan speed and exhaust temperature, compares the filtered derivatives to threshold values and increments a count only if both derivatives exceed their respective threshold values. A surge condition is signaled only if the count is equal to a predetermined value.

CDP measurements are commonly used to detect surge. Methods include monitoring for a high rate of change of CDP, a rapid drop in CDP, or rapid drops and recoveries in CDP. Modern turbomachinery control systems monitor CDP pressure, with a bandwidth or sampling rate much higher than that at which the CDP signal changes during operation. This oversampling results in high autocorrelation of CDP (and CDP rate of change) over the short term. Inversely, short-term average signal variance is quite small during normal operation. A surge event causes the short-term autocorrelation to drop dramatically, and causes the short-term variance to soar CDP corrected for altitude (CDP/turbomachine inlet pressure) provides an even better indication of surge.

As can be seen, there is a need for an improved method and system in order to detect surge conditions within turbomachinery. The improved method and system should reduce the occurrence of false alarms, i.e., the Incorrect signaling of surges, and quickly detect severe surge conditions by monitoring minimal engine parameters and using minimal sensing components.

SUMMARY OF THE INVENTION

In one aspect of the present invention, a method of surge detection within a turbomachine compressor comprises: measuring a compressor discharge pressure (CDP) of the turbomachine over a period of time: determining a time derivative ($CDP_D$) of the measured (CDP); correcting the $CDP_D$ for altitude, ($CDP_{DCOR}$), inputting $CDP_{DCOR}^2$ into a first filter algorithm (FFA); inputting $CDP_{DCOR}$ into a second filter algorithm (SFA); estimating a short-term average of $CDP_{DCOR}^2$ by using the FFA; estimating a short-term average of $CDP_{DCOR}$ by using the SFA; determining a short-term variance of corrected CDP rate of change ($CDP_{roc}$) based upon the short-term average of $CDP_{DCOR}$ and the short-term average of $CDP_{DCOR}^2$; comparing the short-term variance of $CDP_{DCOR}$ rate of change with a predetermined threshold($CDP_{proc}$); signaling an output when $CDP_{roc}>CDP_{proc}$; and signaling an occurrence of a surge within the turbomachine compressor when $CDP_{roc}$ remains>$COP_{proc}$ for pre-determined period of time.

In another aspect of the present invention, a method of surge detection within a turbomachine compressor comprises: measuring the compressor discharge pressure (CDP) of the turbomachine compressor over a period of time; determining a time derivative ($CDP_D$) of the measured (CDP); correcting the $CDP_D$ for altitude, ($CDP_{DCOR}$); estimating a short-term average of $CDP_{DCOR}^2$ by using a first filter algorithm (FFA); estimating a short-term average of $CDP_{DCOR}$ by using the a second filter algorithm (SFA); determining a short-term variance of corrected $CDP_D$ ($CDP_{proc}$) based upon the short-term average of $CDP_{DCOR}$ and the short-term average of $CDP_{DCOR}^2$; comparing the short-term variance of corrected CDP rate of change with a pre-determined short-term variance of CDP rate of change threshold ($CDP_{proc}$); signaling an output when $CDP_{roc}>CDP_{proc}$; and signaling an occurrence of a surge within the turbomachine compressor when $CDP_{roc}$ remains>$CDP_{proc}$ for predetermined period of time.

In another aspect of the present invention, a method of surge detection within a turomachine compressor comprises: measuring the compressor discharge pressure (CDP) of the turbomachinery compressor over a period of time; determining a time derivative ($CDP_D$) of the measured (CDP); correcting the $CDP_D$ for altitude, ($CDP_{DCOR}$); estimating a short-term average of $CDP_{DCOR}^2$; estimating a short-term average of $CDP_{DCOR}$; determining a short-term variance of corrected CDP rate of change ($CDP_D$)based upon the short-term average of $CDP_{DCOR}$ and the short-term average of $CDP_{DCOR}^2$; comparing the short-term variance of corrected CDP rate of change with a pre-determined threshold ($CDP_{proc}$); signaling an output when $CDP_{roc}>CDP_{proc}$; and signaling an occurrence of a surge within the turbomachinery compressor when $CDP_{roc}$ remains>$CDP_{proc}$ for pre-determined period of time.

In another aspect of the present invention, a method of surge detection within a turbomachine compressor comprises: digitally sampling the compressor discharge pressure (CDP) of the compressor over a period of time ($T_{sample}$) by using a compressor discharge pressure probe; determining a time derivative ($CDP_D$) of the measured (CDP), where $CDP_D$ (n)=(CDP(n)−CDP(n−1))/$T_{sample}$, CDP(n) and CDP (n−1) are the nth and (n−1)th sample of CDP respectively and $CDP_D$(n) is the nth sample of $CDP_D$; correcting the $CDP_D$ for altitude, ($CDP_{DCOR}$); inputting $CDP_{DCOR}^2$ into a first filter algorithm (FFA); inputting $CDP_{DCOR}$ into a second filter algorithm (SFA); calculating or estimating a short-term average of $CDP_{DCOR}^2$ ($E[CDP_{DCOR}^2](n)$) by using the FFA which uses a rolling average of the z most recent $CDP_{DCOR}^2$, $E[CDP_{DCOR}^2](n)=[CDP_{DCOR}^2(n)+CDP_{DCOR}^2(n-1)+CDP_{DCOR}^2(n-2)\ldots+CDP_{DCOR}^2(n-(z-1))]/z$ or a bilinear transform implementation of a first order lag $E[CDP_{DCOR}^2](n)=c1*E[CDP_{DCOR}^2](n-1)+((1-c)_1/2)*CDP_{DCOR}^2(n)+((1-c_1)/2)*CDP_{DCOR}^2(n-1)$; calculating or estimating a short-term average of $CDP_{DCOR}$ ($E[CDP_{DCOR}](n)$) by using the SFA which uses a rolling average of the z most recent $CDP_{DCOR}$, $E[CDP_{DCOR}](n)=[CDP_{DCOR}(n)+CDP_{DCOR}(n-1)+CDP_{DCOR}(n-2)\ldots+CDP_{DCOR}(n-(z-1))]/z$ or a bilinear transform implementation of a first order lag $E[CDP_{DCOR}](n)=c1*E[CDP_{DCOR}](n-1)+((1-c_1)/2)*CDP_{DCOR}(n)+((1-c_1)/2)*CDP_{DCOR}(n-1)$; determining a short-term variance of corrected CDP rate of change ($Var[CDP_{DCOR}]$) based upon $E^2[CDP_{DCOR}]$ and $E[CDP_{DCOR}^2]$, $Var[CDP_{DCOR}]=E[CDP_{DCOR}^2]-E^2[CDP_{DCOR}]$; comparing the short-term variance of corrected CDP rate of change with a pre-determined threshold ($CDP_{proc}$); signaling an output when $Var[CDP_{DCOR}]>CDP_{proc}$; and signaling an occurrence of a surge within the turbomachine compressor when $Var[CDP_{DCOR}]$ remains>$CDP_{proc}$ for pre-determined period of time.

In another aspect of the present invention, a system for surge detection within a turbomachine compressor comprises: a compressor discharge probe that measures the compressor discharge pressure (CDP) of the turbomachine compressor over a period of time; a signal processor that receives the CDP measurements from the compressor discharge probe, determines a time derivative ($CDP_D$) of the measured CDP and corrects the $CDP_D$ for altitude, ($CDP_{DCOR}$); a first filter which receives $CDP_{DCOR}^2$ and performs a first filter algorithm (FFA) that estimates a short-term average of $CDP_{DCOR}^2$; and a second filter which receives $CDP_{DCOR}$ and performs a second filter algorithm (SFA) that estimates a short-term average of $CDP_{DCOR}$, wherein the signal processor determines a short-term variance of $CDP_{DCOR}$ ($CDP_{roc}$) based upon the short-term average of $CDP_{DCOR}$ and the short-term average of $CDP_{DCOR}^2$; compares the short-term variance of corrected CDP rate of change ($CDP_{roc}$)with a pre-determined threshold ($CDP_{proc}$); signals an output when $CDP_{roc}>CDP_{proc}$; and signals an occurrence of a surge within the turbomachine compressor when $CDP_{roc}$ remains>$CDP_{proc}$ for pre-determined period of time.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a new, robust method for surge detection based on a short-term estimate of the variance of the altitude-corrected rate of change of CDP. During normal operation, CDP changes slowly and smoothly relative to the bandwidth or sampling rate of turbomachinery control systems. The resulting autocorrelation of CDP and CDP rate of change is relatively high over the short term (Autocorrelation is a statistical measure of the relatedness of samples of a signal at different points in time). This autocorrelation drops dramatically during a surge, providing an excellent means of detecting surge. Autocorrelation is difficult to calculate in a real time environment. However, short-term signal variance is inversely proportional to short-term autocorrelation, and is easily calculated, thus providing an outstanding surge detection mechanism.

The improved method and system of the present invention provides surge detection where fewer false alarms occur and a single parameter and sensor are used for detection. The present invention provides an effective method and system which detect undesirable surges that may occur during the operation of turbomachinery. By using the present invention for surge detection, control systems within the turbomachinery may take appropriate corrective action to eliminate the surge and return the turbomachinery back to an acceptable operating condition. The present invention provides the control system of the turbomachinery with quick and accurate detection of surge conditions, thereby preventing or minimizing any sustained power losses or mechanical damage to the turbomachinery.

Figure 1:
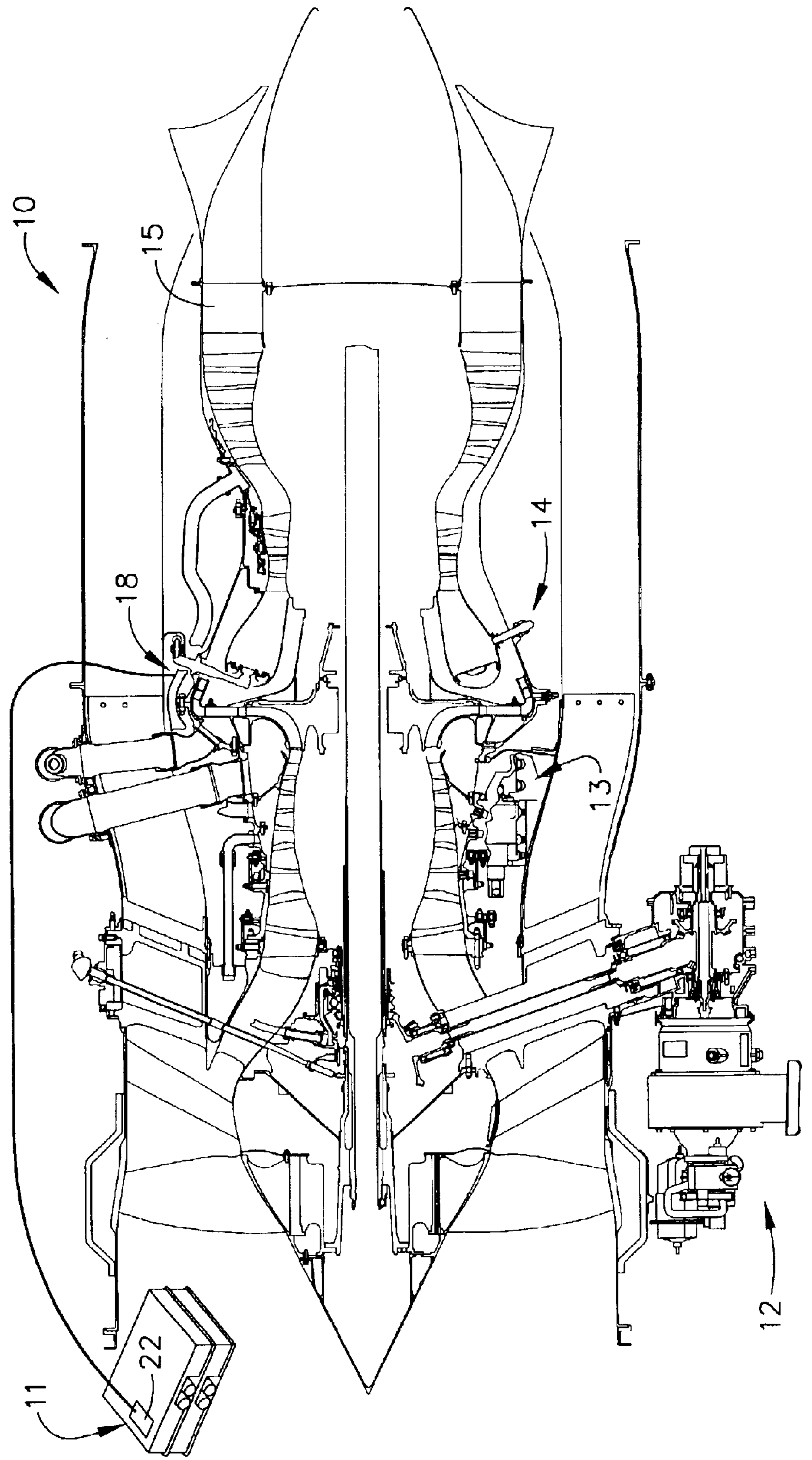
FIG. 1 shows an exemplary cross sectional view of a gas turbine engine.

Referring to FIG. 1, an exemplary cross sectional view of a gas turbine engine is shown. The gas turbine engine 10 may include various components for control purposes. Electronic control unit (ECU) 11 can transmit control signals to the engine in order to control the various components and systems for the gas turbine engine 10 during operation. The ECU 11 can also receive signals from various sensors positioned within the gas turbine engine 10 in order to activate corrective measures and signal operating conditions. Surge bleed valves 13 are used during normal operation and may also be activated during surge periods in order to counter surge conditions that may occur during operation. The activation of the surge bleed valves 13 helps to stabilize compression stage airflow and pressure and limits the period of the surge condition by balancing the airflow and pressure ratio of the gas turbine engine 10. Compressor discharge pressure (CDP) may be monitored by a CDP probe 18. This probe may be mounted at the compressor or located within the ECU, connected to the compressor with a pneumatic line. The CDP probe 18 may transmit signals to a signal processor 22 found in the ECU 11. Signal processor 22 can perform the variance detection functions as described below.

Figure 2A:
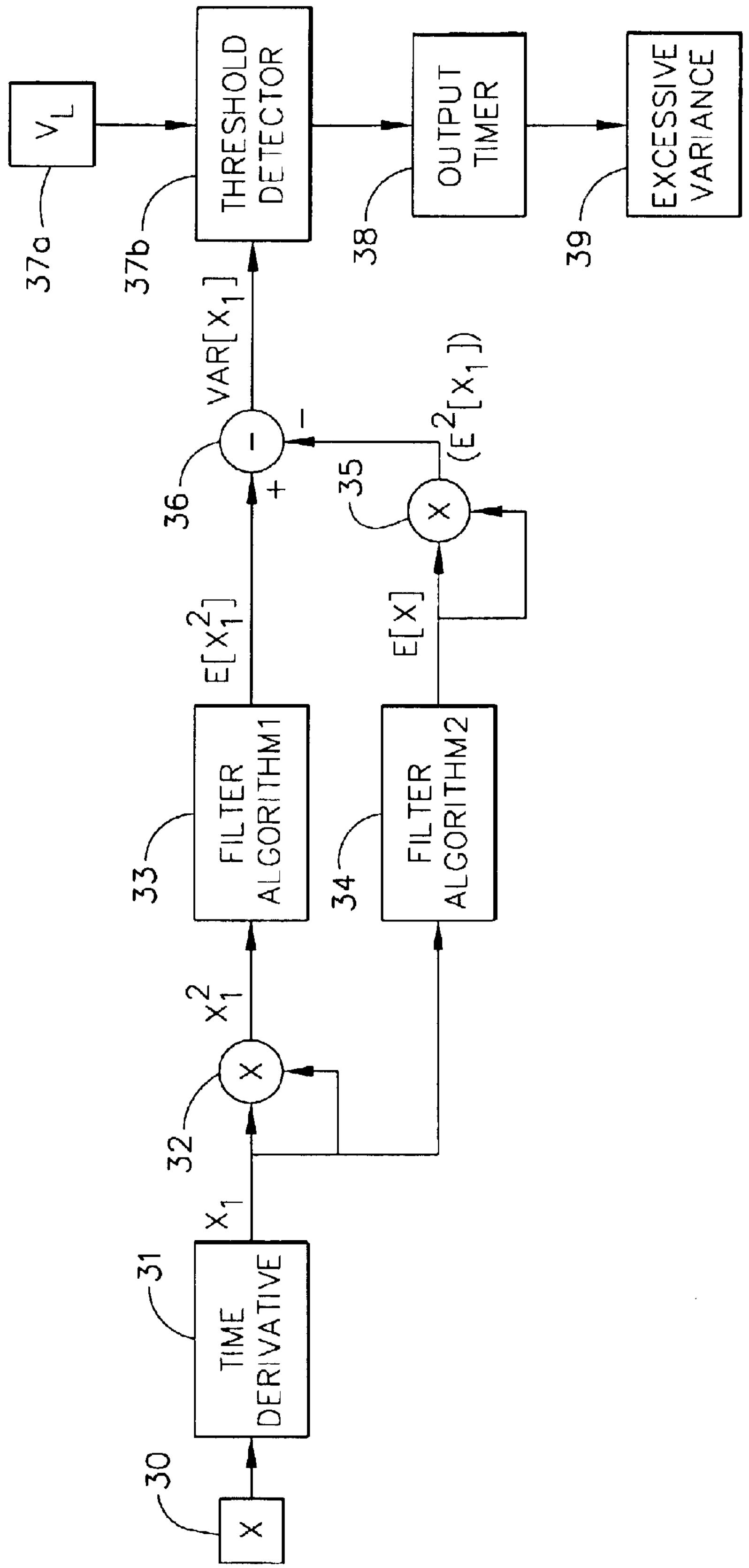
FIG. 2*a* shows a block diagram of an exemplary variance detector according to the present invention.

Referring to FIG. 2*a*, a block diagram of an exemplary variance detector of the present invention is shown. The variance detector of FIG. 2*a*may be based upon the standard statistical calculation of variance:

$$\text{Variance}[x]=E[x^2]-E^2[x]$$

where E is the statistical expectation operator and x is an input signal. The present invention may seek to calculate "short term variance" which is defined as the variance of a time-varying sequence or signal over a short interval. The set of numbers x ($x_1, x_2, x_3, x_4 \ldots x_n$) used in the calculation of the short-term variance is not a static set of numbers, but a set of the "most recent" x's. The expectation operators may be implemented as rolling averages of x and $x^2$, where the rolling averages may be easily implemented in digital systems by using filters such as a finite impulse response filter or a rolling average filter. Other alternative filters may include a first order lag in digital systems or a simple first order filter in analog systems.

Signal x, block 30, may be input into time derivative block 31. The time derivative block 31 may take the time derivative $x_1$ (dx/dt) of the input signal x, where the time derivative may be calculated by using either of the following equations:

$x_1(n)=(x(n)-x(n--1))/T_{sample}$, digital system where x(n) is the nth sample of x, x(n−1) is the n−1 th sample of x; or $X_1(s)=s\ X(s)$, analog system, where s indicates the time differentiation operation in the frequency domain (via standard LaPlace transformation methods), X(s) is the frequency-domain representation of the input data stream, and $X_1(s)$ is the frequency-domain representation of the derivative of the input data stream The resultant time derivative $x_1$ may be sent through a second filter algorithm (SFA) 34 and a multiplier 32 which may square $x_1$ and which may be sent through a first filter algorithm (FFA) 33.

The FFA 33 may estimate the short-term average of $x_1^2$. The short-term average of z readings may be found by using a rolling average:

$$E[x_1^2](n)=[x_1^2(n)+x_1^2(n-1)+x_1^2\ (n-2)\ \ldots\ +X_1^2\ (n-(z-1))]/z.$$

The short-term average of $x_1^2$ may also be estimated by using a standard filter such as a first order lag:

$$E[x_1^2](n)-c_1{}^*E[x_1^2](n-1)+((1-c_1)/2)^*x_1^2(n)+((1-c_1)/2^*x_1^2\ (n-1)$$

which is a bi-linear realization of a first-order lag and $c_1$ is the filter coefficient. The FFA 33 may also be implemented through an analog system where the short term average of $x_1^2$ may be estimated by:

$$E[X_1^2](s)-X_1^2(s)/(Ts+1)$$

where T is the time constant of the filter.

The SFA 34 may estimate the short-term average of $x_1$. The short-term average of z readings may be found by using a rolling average:

$$E[x_1](n)=[x_1(n)+x_1(n-1)+x_1(n-2)\ \ldots\ +x_1(n-(z-1))]/z.$$

The short-term average of xi may also be estimated by using a standard filter such as a first order lag:

$$E[x_1](n)\sim c_1{}^*E[x_1](n-1)+((1-c_1)/2)^*x_1(n)+((1-c_1)/2)^*x_1(n-1)$$

which may be a bi-linear realization of a first-order lag. The SFA 34 may also be implemented through an analog system where the short-term average of $x_1$ may be estimated by:

$$E[X_1](s)\sim X_1(s)/(Ts+1)$$

In order to obtain the short-term variance, the resultant of the SFA 34 may be squared through multiplier 35, $E^2[x_1]$ and subtracted from $E[x_1^2]$ where $Var[x_1]=E[x_1^2]-E^2[x_1]$. A threshold detector 37*b* may then receive the values for Var[xi] and a pre-determined threshold value of variance $V_L$ 37*a*. The $Var[x_1]$ may be then compared to $V_L$, and the threshold detector 37*b* may output a signal ($output_c=1$) to an output timer 38 when $Var[x_1]>V_L$. The output timer 38 may signal an output ($output_T=1$) indicating an excessive variance 39 after output timer 38 has received an input of $output_c=1$ for a pre-determined amount of time or percentage of time over a given time interval. By utilizing the above method one may avoid false alarms and reliable signals of variance detection may therefore be produced.

Figure 2B:
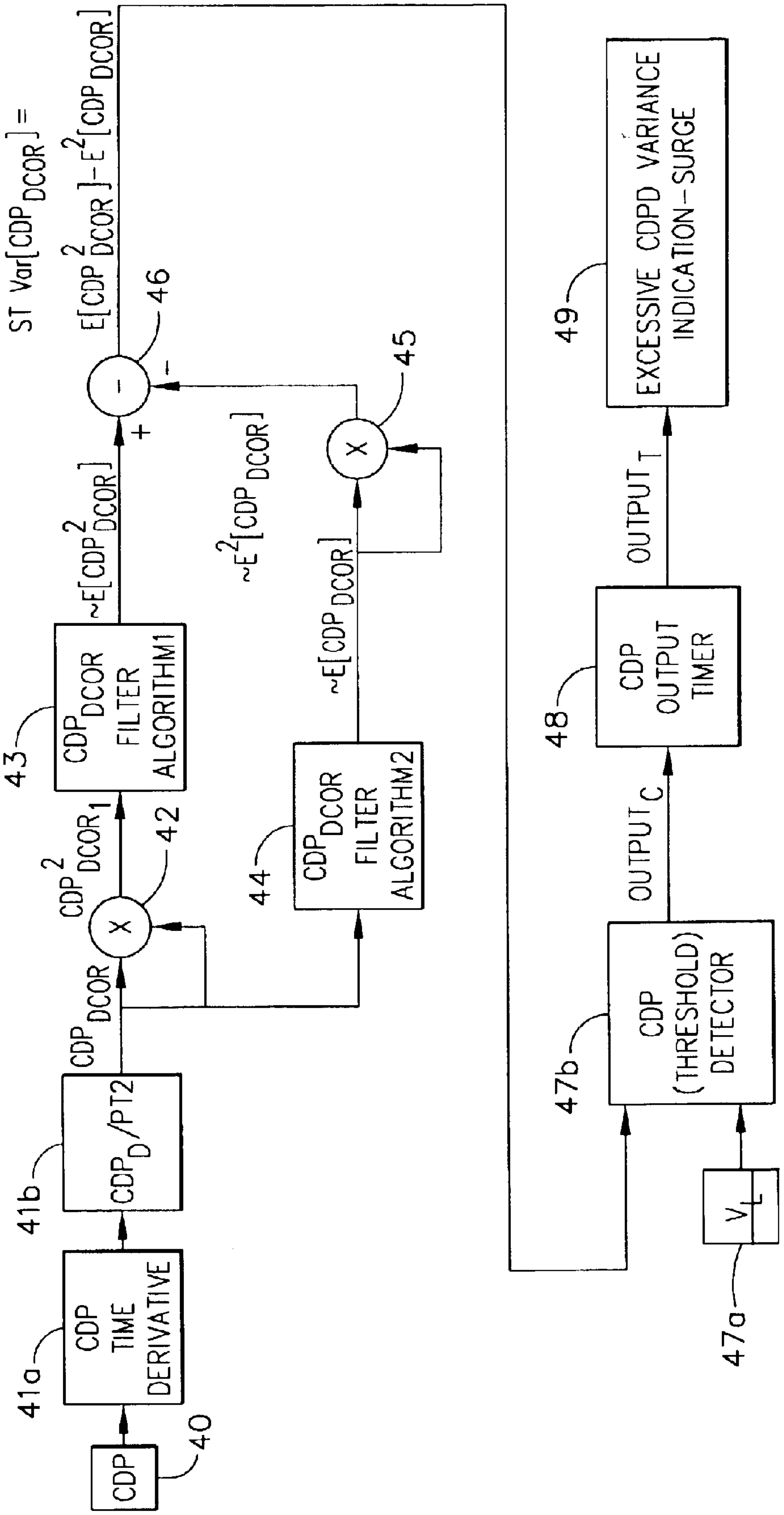
FIG. 2*b* shows a block diagram of an exemplary variance detector as applied to compressor discharge pressure according to the present invention.

Referring to FIG. 2*b*, a block diagram of an exemplary variance detector as applied to compressor discharge pressure according to the present invention is shown. Similar to FIG. 2*a*, the CDP 40 may be input to CDP time derivative 41 which represents signal processor 22 of FIG. 1 and CDP 40 may be the result of signal readings received by the CDP sensor 18. The CDP sensor 18, in one exemplary application, may be sampled every 20–30 ms . Accordingly, the CDP time derivative function 41*a* may take the time derivative of the input signal CDP, where the CDP time derivative ($CDP_D$) may be calculated by using either of the following equations:

$CDP_D(n)=(CDP(n)-CDP(n-1))/T_{sample}$, digital system; or $CDP_D(s)=s\ CDP(s)$, analog system The resultant time derivative $CDP_D$ may be corrected for altitude to improve altitude surge detection via; an altitude correction 41*b*, where the altitude corrected $CDP_D$ ($CDP_{DCOR}$) may be calculated by using the following equation:

$CDP_{DCOR}=CDP_D/PT2$, where PT2 is the engine inlet pressure The resultant altitude-corrected time derivative $CDP_{DCOR}$ may be sent through a CDP second filter algorithm (SFA) 44 and a multiplier 42 which squares $CDP_{DCOR}$ and which may be sent through a CDP first filter algorithm (FFA) 43.

The CDP FFA 43 may estimate the short-term average of $CDP_{DCOR}^2$. The short-term average of z readings may be found by using a rolling average:

$$E[CDP_{DCOR}^2](n)=[CDP_{DCOR}^2(n)+CDP_{DCOR}^2(n-1)+CDP_{DCOR}^2(n-2)\ldots+CDP_{DCOR}^2(n(z-1))]/z$$

where $CDP_{DCOR}^2$(n) is the n$^{th}$ sample of $CDP_{DCOR}^2$. The short-term average of $CDP_{DCOR}^2$ may also be estimated by using a standard filter such as a first order lag:

$$E[CDP_{DCOR}^2](n)\sim c_1*E[CDP_{DCOR}^2](n-1)+((1-c_1)/2)*CDP_{DCOR}^2(n)+((1-c_1)/2)*CDP_{DCOR}^2\ (n-1)$$

which is a bi-linear realization of a first-order lag. The CDP FFA 43 may also be implemented through an analog system where the short term average of $CDP_{DCOR}^2$ may be estimated by:

$$E[CDP_{DCOR}^2](s)\sim CDP_{DCOR}^2(s)/(Ts+1).$$

The CDP SFA 44 may estimate the short term average of $CDP_{DCOR}$. The short-term average of z readings may be found by using a rolling average:

$$E[CDP_{DCOR}](n)=[CDP_{DCOR}(n)+CDP_{DCOR}(n-1)+CDP_{DCOR}(n-2)\ldots+CDP_{DCOR}(n-(z-1))]/z$$

where $CDP_{DCOR}$(n) is the n$^{th}$ sample of $CDP_{DCOR}$. The short-term average of $CDP_{DCOR}$ may also be calculated by using a standard filter such as a first order lag:

$$E[CDP_{DCOR}](n)\sim c_1*E[CDP_{DCOR}](n-1)+((1-c_1)/2)*CDP_{DCOR}(n)+((1-c_1)/2)*CDP_{DCOR}(n-1)$$

which may be a bi-linear realization of a first-order lag. The CDP SFA 44 may also be implemented through an analog system where the short term average of $CDP_{DCOR}$ may be calculated by:

$$E[CDP_{DCOR}](s)\sim CDP_{DCOR}(s)/(Ts+1).$$

In order to obtain the short term variance of the corrected CDP rate of change, the resultant of the CDP SFA 44 may be squared through second multiplier 45, $E^2[CDP_{DCOR}]$ and subtracted from $E[CDP_{DCOR}^2]$ where $Var[CDP_{DCOR}]=E[CDP_{DCOR}^2]-E^2[CDP_{DCOR}]$. A CDP threshold detector 47*b*may then receive the values for $Var[CDP_{DCOR}]$ and a pre-determined value of variance $V_L$ 47*a*. The $Var[CDP_D]$ may then be compared to $V_L$, and the CDP threshold detector 47*b* may output a signal ($output_c=1$) to a CDP output timer 38 when $Var[CDP_D]>V_L$. The CDP output timer 48 may signal an output ($output_T=1$) indicating an excessive CDP variance 49 after CDP output timer 48 has received an input of $output_c=1$ for a pre-determined amount of time or percentage of time over a given time interval.

The implementation of this variance detection may assist in accurately determining the occurrence of surge within the gas turbine engine 10. The measurement of short-term variance of corrected CDP or corrected CDP rate of change may easily distinguish surge occurrences from normal operation of the gas turbine engine 10. Measurement of short-term variance of the corrected CDP rate of change may help to eliminate false alarms and may provide reliable signals of surges that occur during operation of gas turbine engine 10.

EXAMPLES

Figure 3A:
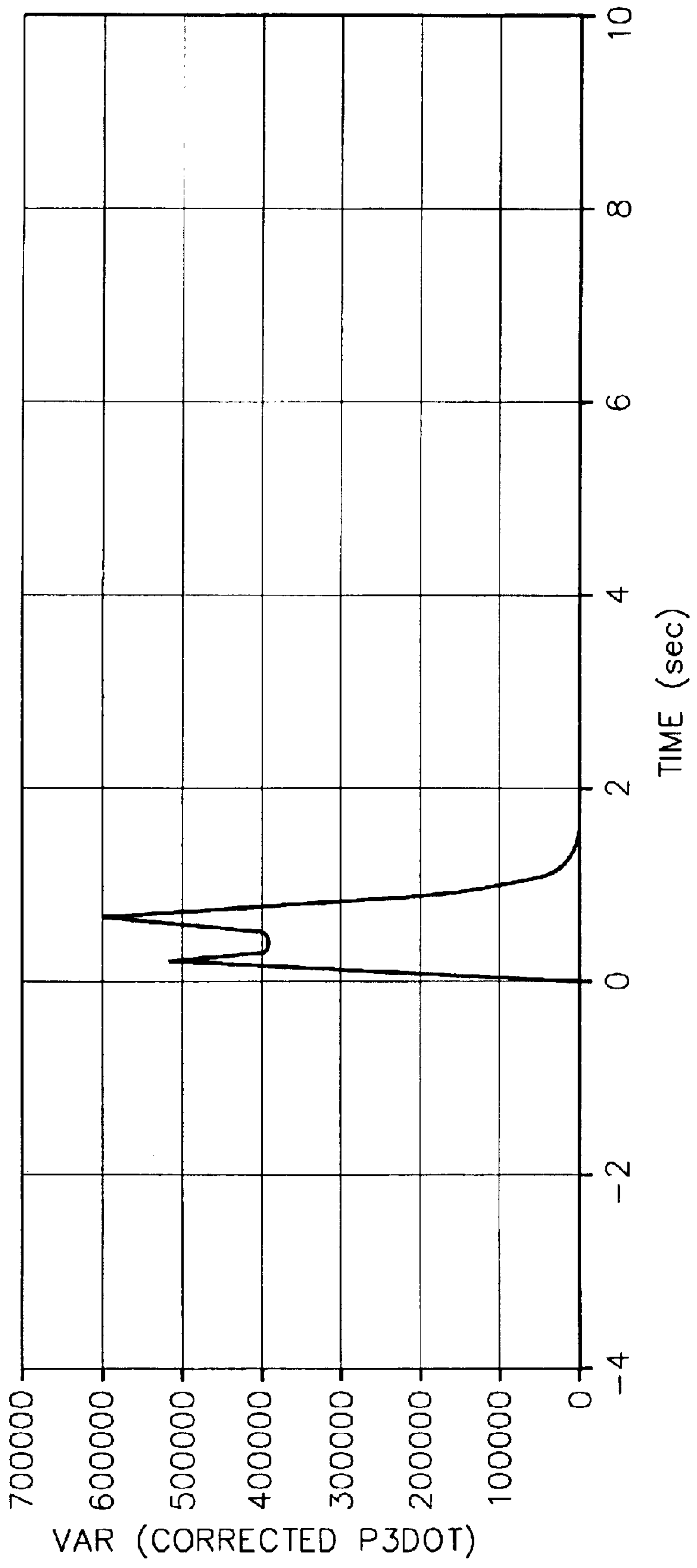
FIG. 3*a* shows a graph of the variance of compressor discharge pressure during a severe surge on a hard acceleration.
Figure 3B:
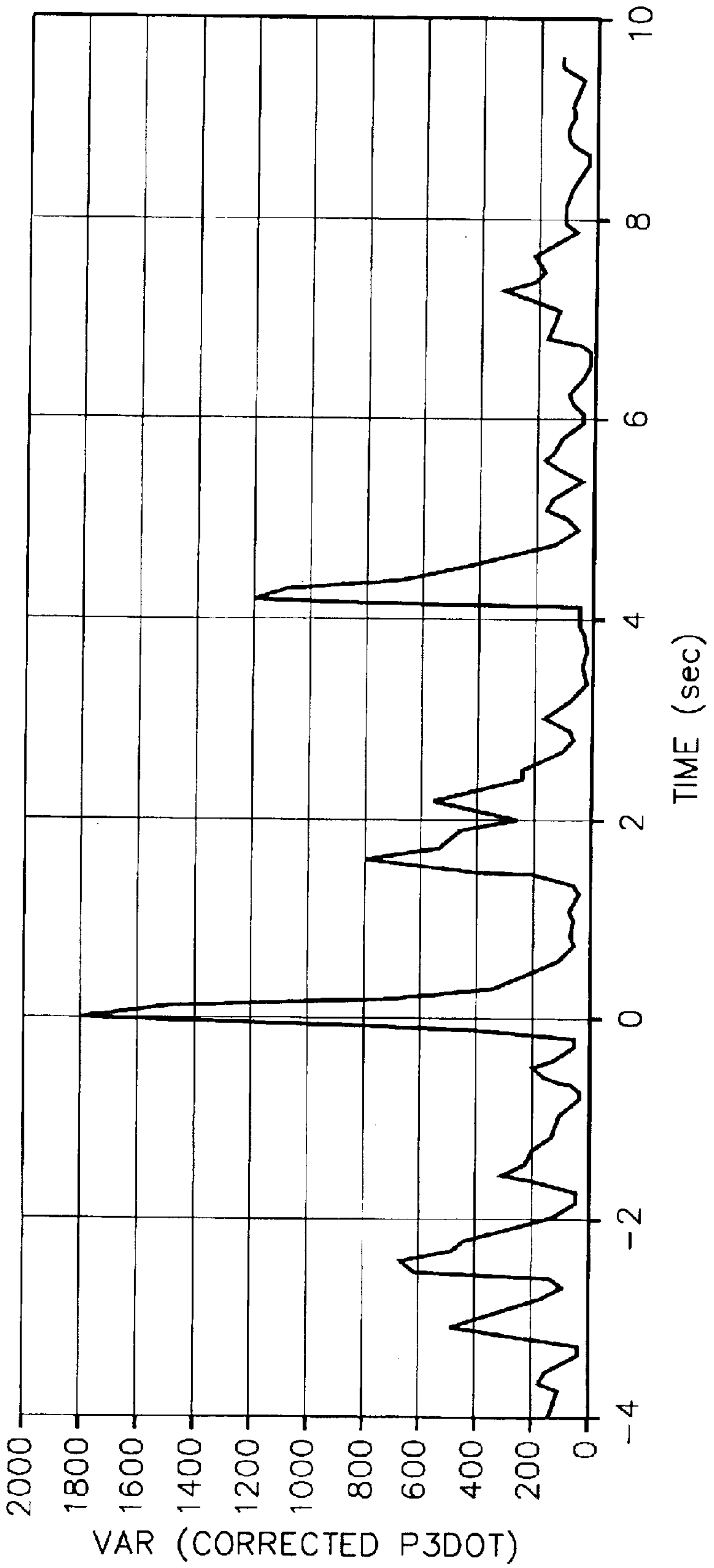
FIG. 3*b* shows a graph of the variance of compressor discharge pressure during a surge-free hard acceleration.

Referring now to FIG. 3*a*, a graph of the variance of compressor discharge pressure altitude-corrected rate of change during a severe surge on a hard acceleration is shown. Referring to FIG. 3*b*, a graph of the variance of compressor discharge pressure altitude-corrected rate of change during a surge-free hard acceleration is shown. FIGS. 3*a* and 3*b* show typical variance of the corrected compressor discharge pressure rate of change during a severe surge event and normal operation of an exemplary gas turbine engine 10, where P3DOT/Pamb/14.696 psia) is the corrected compressor discharge pressure rate of change, 96 ms is the data sample rate, and bi-linear implementation of first order lag (Tau of 0.125 sec) is the method of averaging E[x] and E[$x^2$]. The high signal noise ratio of the variance detector of the present invention makes it ideal for detecting engine surge.

It should be understood, of course, that the foregoing relates to preferred embodiments of the invention and that modifications may be made without departing from the spirit and scope of the invention as set forth in the following claims.

We claim:

1. A method of surge detection within a turbomachine compressor, comprising:

measuring the compressor discharge pressure (CDP) of the turbomachine compressor over a period of time;

determining a time derivative ($CDP_D$) of the measured (CDP);

correcting the $CDP_D$ for altitude, ($CDP_{DCOR}$)

inputting $CDP_{DCOR}^2$ into a first filter algorithm (FFA);

inputting $CDP_{DCOR}$ into a second filter algorithm (SFA);

estimating a short-term average of $CDP_{DCOR}^2$ by using the FFA;

estimating a short-term average of $CDP_{DCOR}$ by using the SFA;

determining a short-term variance of corrected $CDP_D$ ($CDP_{roc}$) based upon the short-term average of $CDP_{DCOR}$ and the short-term average of $CDP_{DCOR}^2$;

comparing the short-term variance of $CDP_{DCOR}$ rate of change with a pre-determined threshold ($CDP_{proc}$);

signaling an output when $CDP_{roc}>CDP_{proc}$; and signaling an occurrence of a surge within the turbomachine compressor when $CDP_{roc}$ remains>$CDP_{proc}$ for pre-determined period of time.

2. The method of claim 1, further comprising:

executing the first filter algorithm with a first digital filter; and executing the second filter algorithm with a second digital filler.

3. The method of claim 2, wherein the first filter algorithm is a rolling average of the most recent $CDP_{DCOR}^2$ values and the second filter algorithm is a rolling average of the most recent $CDP_{DCOR}$ values.

4. The method of claim 3, wherein the first filter algorithm is calculated of the z most recent $CDP_{DCOR}^2$ values and the second filter algorithm is calculated of the z most recent $CDP_{DCOR}$ values, where the short-term average of $CDP_{DCOR}^2$ is equal to:

$$E[CDP_{DCOR}^2](n)=[CDP_{DCOR}^2(n)+CDP_{DCOR}^2(n-1)+CDP_{DCOR}^2(n-2)\ldots+CDP_{DCOR}^2\ (n-(z-1))]/z,$$

where $CDP_{DCOR}^2$(n) is the n$^{th}$ sample of $CDP_{DCOR}^2$, and the short term average of $CDP_{DCOR}$ is equal to:

$$E[CDP_{DCOR}](n)=[CDP_{DCOR}(n)+CDP_{DCOR}(n-1)+CDP_{DCOR}(n-2)\ldots+CDP_{DCOR}(n-(z-1))]/z,$$ where $CDP_{DCOR}(n)$ is the $n^{th}$ sample of $CDP_{DCOR}$.

5. The method of claim 2, where the first filter algorithm is a bilinear implementation of a first order lag and the second filter algorithm is a bilinear implementation of another first order lag.

6. The method of claim 5, wherein the short-term average of $CDP_{DCOR}^2$ is equal to $$E[CDP_{DCOR}^2](n) \sim c_1 * E[CDP_{DCOR}^2](n-1) + ((1-c_1)/2) * CDP_{DCOR}^2(n) + ((1-c_1)/2) * CDP_{DCOR}^2(n-1)$$

where $CDP_{DCOR}^2$(n) is the $n^{th}$ sample of $CDP_{DCOR}^2$ and $c_1$ is a filter coefficient, and the short term average of $CDP_{DCOR}$ is equal to:

$$E[CDP_{DCOR}](n) \sim c_1 * E[CDP_{DCOR}](n-1) + ((1-c_1)/2) * CDP_{DCOR}(n) + ((1-c_1)/2) * CDP_{DCOR}(n-1)$$

where $CDP_{DCOR}$(n) is the $n^{th}$ sample of $CDP_{DCOR}$ and $c_1$ is a filter coefficient.

7. The method of claim 1, further comprising:

executing the first filter algorithm with a first analog filter; and executing the second filter algorithm with a second analog filter.

8. The method of claim 7, wherein the first analog filter is represented by the following equation to estimate a short term average of $CDP_{DCOR}^2$:

$$E[CDP_{DCOR}^2](s) \sim CDP_{DCOR}^2(s)/(Ts+1)$$

where $CDP_{DCOR}^2$(s) is the frequency-domain representation of the $CDP_{DCOR}^2$ and T is the time constant of the filter, and where the second analog filter is represented by the following equation to estimate the short term average of $CDP_{DCOR}$:

$$E[CDP_{DCOR}](s) \sim CDP_{DCOR}(s)/(Ts+1).$$

where $CDP_{DCOR}$ (s) is the frequency-domain representation of the $CDP_{DCOR}$ and T is the time constant of the filter.

9. The method of claim 4, wherein the step determining a short-term variance of corrected CDP rate of change ($CDP_{roc}$) based upon the short-term average of $CDP_{DCOR}$ ($E^2[CDP_{DCOR}]$) and the short-term average of $CDP_{DCOR}^2$ ($E[CDP_{DCOR}^2]$), is executed by the following equation:

$$Var[CDP_{DCOR}] = E[CDP_{DCOR}^2] - E^2[CDP_{DCOR}].$$

10. The method of claim 6, wherein the step determining a short-term variance of corrected CDP rate of change ($CDP_{roc}$) based upon the short-term average of $CDP_{DCOR}$ ($E^2[CDP_{DCOR}]$) and the short-term average of $CDP_{DCOR}^2$ ($E[CDP_{DCOR}^2]$), is executed by the following equation:

$$Var[CDP_{DCOR}] = E[CDP_{DCOR}^2] - E^2[CDP_{DCOR}].$$

11. The method of claim 8, wherein the step determining a short-term variance of corrected CDP rate of change ($CDP_{roc}$) based upon the short-term average of $CDP_{DCOR}$ ($E^2[CDP_{DCOR}]$) and the short-term average of $CDP_{DCOR}^2$ ($E[CDP_{DCOR}^2]$) is executed by the following equation:

$$Var[CDP_{DCOR}] = E[CDP_{DCOR}^2] - E^2[CDP_{DCOR}].$$

12. A method of surge detection within a turbomachine compressor, comprising:

measuring a compressor discharge pressure (CDP) of the turbomachine compressor over a period of time;

determining a time derivative ($CDP_D$) of the measured (CDP);

correcting the $CDP_D$ for altitude, ($CDP_{DCOR}$);

estimating a short-term average of $CDP_{DCOR}^2$ by using a first filter algorithm (FFA);

estimating a short-term average of $CDP_{DCOR}$ by using a second filter algorithm (SFA);

determining a short-term variance of corrected CDP rate of change ($CDP_{roc}$) based upon the short-term average of $CDP_{DCOR}$ and the short-term average of $CDP_{DCOR}^2$;

comparing the short-term variance of corrected CDP rate of change with a pre-determined threshold ($CDP_{proc}$);

signaling an output when $CDP_{roc} > CDP_{proc}$; and signaling an occurrence of a surge within the turbomachine compressor when $CDP_{roc}$ remains$> CDP_{proc}$ for pre-determined period of time.

13. The method of claim 12, wherein a first digital filter performs the step of estimating a short-term average of $CDP_{DCOR}^2$, wherein a second digital filter performs the step of estimating a short-term average of $CDP_{DCOR}$.

14. The method of claim 12, wherein a first analog filter performs the step of estimating a short-term average of $CDP_{DCOR}^2$, wherein a second analog filter performs the step of estimating a short term average of $CDP_{DCOR}$.

15. The method of claim 13, wherein the first filter algorithm is a bilinear implementation of a first order lag and the second filter algorithm is a bilinear implementation of a first order lag.

16. The method of claim 15, wherein the short-term average of $CDP_{DCOR}^2$ is equal to:

$$E[CDP_{DCOR}^2](n) \sim c_1 * E[CDP_{DCOR}^2](n-1) + ((1-c_1)/2) * CDP_{DCOR}^2(n) + ((1-c_1)/2) * CDP_{DCOR}^2(n-1)$$

where $CDP_{DCOR}^2$(n) is the $n^{th}$ sample of $CDP_{DCOR}^2$ and wherein $c_1$ is a filter coefficient, and wherein the short term average of $CDP_{DCOR}$ is equal to:

$$E[CDP_{DCOR}](n) \sim c_1 * E[CDP_{DCOR}](n-1) + ((1-c_1)/2) * CDP_{DCOR}(n) + ((1-c_1)/2) * CDP_{DCOR}(n-1)$$

where $CDP_{DCOR}$(n) is the $n^{th}$ sample of $CDP_{DCOR}$ and where $c_1$ is a filter coefficient.

17. The method of claim 13, where the first filter algorithm is a rolling average of the most recent $CDP_{DCOR}^2$ values and the second filter algorithm is a rolling average of the most recent $CDP_{DCOR}$ values.

18. The method of claim 17, wherein the rolling average is calculated of the z most recent $CDP_{DCOR}^2$ values, where the short-term average of $CDP_{DCOR}^2$is equal to:

$$E[CDP_{DCOR}^2](n) = [CDP_{DCOR}^2(n) + CDP_{DCOR}^2(n-1) + CDP_{DCOR}^2(n-2) \ldots + CDP_{DCOR}^2(n-(z-1))]/z$$

where $CDP_{DCOR}^2$(n) is the $n^{th}$ sample of $CDP_{DCOR}^2$, and wherein the second filter algorithm is the rolling average is calculated of the z most recent $CDP_{DCOR}$, and the short-term average of $CDP_{DCOR}$ is equal to:

$$E[CDP_{DCOR}](n) = [CDP_{DCOR}(n) + CDP_{DCOR}(n-1) + CDP_{DCOR}(n-2) \ldots + CDP_{DCOR}(n-(z-1))]/z$$

where $CDP_{DCOR}$(n) is the $n^{th}$ sample of $CDP_{DCOR}$.

19. The method of claim 14, wherein the first analog filter is represented by the following equation to estimate the short term average of $CDP_{DCOR}^2$:

$$E[CDP_{DCOR}^2](s) \sim CDP_{DCOR}^2(s)/(Ts+1)$$

and wherein the second analog filter is represented by the following equation to estimate the short term average of $CDP_{DCOR}$:

$$E[CDP_{DCOR}](s) \sim CDP_{DCOR}(s)/(Ts+1).$$

20. The method of claim 16, where the step determining a short-term variance of corrected CDP rate of change ($CDP_{roc}$) based upon the short-term average of $CDP_{DCOR}$ and the short-term average of $CDP_{DCOR}^2$, is executed by the following equation, $$Var[CDP_{DCOR}]=E[CDP_{DCOR}^2]-E^2[CDP_{DCOR}].$$

21. The method of claim 18, where the step determining a short-term variance of corrected CDP rate of change ($CDP_{roc}$) based upon the short-term average of $CDP_{DCOR}$ and the short-term average of $CDP_{DCOR}^2$, is executed by the following equation, $$Var[CDP_{DCOR}]=E[CDP_{DCOR}^2]-E^2[CDP_{DCOR}].$$

22. The method of claim 19, where the step determining a short-term variance of corrected CDP rate of change ($CDP_{roc}$) based upon the short-term average of $CDP_{DCOR}$ and the short-term average of $CDP_{DCOR}^2$, is executed by the following equation, $$Var[CDP_{DCOR}]=E[CDP_{DCOR}^2]-E^2[CDP_{DCOR}].$$

23. A method of surge detection within a turbomachinery compressor, comprising:

measuring the compressor discharge pressure (CDP) of the turbomachinery compressor over a period of time;

determining a time derivative ($CDP_D$) of the measured (CDP);

correcting the $CDP_D$ for altitude, ($CDP_{DCOR}$);

estimating a short-term average of $CDP_{DCOR}^2$;

estimating a short-term average of $CDP_{DCOR}$;

determining a short-term variance of corrected CDP rate of change ($CDP_{roc}$) based upon the short-term average of $CDP_{DCOR}$ and the short-term average of $CDP_{DCOR}^2$;

comparing the short-term variance of $CDP_D$ rate of change with a pre-determined threshold ($CDP_{proc}$);

signaling an output when $CDP_{roc}>CDP_{proc}$; and signaling an occurrence of a surge within the turbomachinery compressor when $CDP_{roc}$ remains>$CDP_{proc}$ for pre-determined period of time.

24. The method of claim 23, where the step of estimating a short-term average of $CDP_{DCOR}^2$ includes the step of executing a first filter algorithm with a first digital filter.

25. The method of claim 24, where step of estimating a short-term average of $CDP_{DCOR}$ includes the step of executing a second filter algorithm with a second digital filter.

26. The method of claim 23, where the step of estimating a short-term average of $CDP_{DCOR}^2$ includes the step of executing a first filter algorithm with a first analog filter.

27. The method of claim 26, where step of estimating a short-term average of $CDP_D$ includes the step of executing a second filter algorithm with a second analog filter.

28. A method of surge detection within a turbomachinery compressor, comprising:

digitally sampling the compressor discharge pressure (CDP) of the turbomachinery compressor over a period of time ($T_{sample}$) by using a compressor discharge pressure probe;

determining a time derivative ($CDP_D$) of the measured (CDP), where $CDP_D(n)=(CDP(n)-CDP_{(n-}1))/T_{sample}$, CDP(n) is the nth sample of CDP;

correcting the $CDP_D$ for altitude, ($CDP_{DCOR}$);

inputting $CDP_{DCOR}^2$ into a first filter algorithm (FFA);

inputting $CDP_{DCOR}$ into a second filter algorithm (SFA);

estimating a short-term average of $CDP_{DCOR}^2$(E[$CDP_{DCOR}^2$](n)) by using the FFA which uses a rolling average of the z most recent $CDP_{DCOR}^2$ where $$E[CDP_{DCOR}^2](n)=[CDP_{DCOR}^2(n)+CDP_{DCOR}^2(n-1)+CDP_{DCOR}^2(n-2)\ldots+CDP_{DCOR}^2(n-(z-1))]/z;$$

estimating a short-term average of $CDP_{DCOR}$ (E[$CDP_{DCOR}$](n)) by using the SFA which uses a rolling average of the z most recent $CDP_{DCOR}$ where $$E[CDP_{DCOR}](n)=[CDP_{DCOR}(n)+CDP_{DCOR}(n-1)+CDP_{DCOR}(n-2)\ldots+CDP_D(n-(z-1))]/z;$$

determining a short-term variance of corrected CDP rate of change (Var[$CDP_{DCOR}$]) based upon E[$CDP_{DCOR}$] and E[$CDP_{DCOR}^2$] where $$Var[CDP_{DCOR}]=E[CDP_{DCOR}^2]-E^2[CDP_{DCOR}];$$

comparing the short-term variance of CDP rate of change with a pre-determined threshold ($CDP_{proc}$);

signaling an output when Var[$CDP_{DCOR}$]>$CDP_{proc}$; and signaling an occurrence of a surge within the turbomachinery compressor when Var[$CDP_{DCOR}$] remains>$CDP_{proc}$ for pre-determined period of time.

29. A system for surge detection within a turbomachinery compressor, comprising:

a compressor discharge probe that measures the compressor discharge pressure (CDP) of the turbomachinery compressor over a period of time;

a signal processor that receives the CDP measurements from the compressor discharge probe, determines a time derivative ($CDP_D$) of the measured (CDP) and corrects the $CDP_D$ for altitude, ($CDP_{DCOR}$);

a first filter which receives $CDP_{DCOR}^2$ and performs a first filter algorithm (FFA) that estimates a short-term average of $CDP_{DCOR}^2$; and a second filter which receives $CDP_{DCOR}$ and performs a second filter algorithm (SFA) that estimates a short-term average of $CDP_{DCOR}$, wherein the signal processor determines a short-term variance of corrected CDP rate of change ($CDP_{roc}$) based upon the short-term average of $CDP_{DCOR}$ and the short-term average of $CDP_{DCOR}^2$, compares the short-term variance of corrected CDP rate of change with a pre-determined threshold ($CDP_{proc}$), signals an output when $CDP_{roc}>CDP_{proc}$, and signals an occurrence of a surge within the turbomachinery compressor when $CDP_{roc}$ remains>$CDP_{proc}$ for pre-determined period of time.

30. The system for surge detection within a gas turbine engine according to claim 29, wherein the signal processor determines the time derivative over a pre-determined time interval.

31. The system for surge detection within a gas turbine engine according to claim 29, wherein the first filter is a first digital filter and the second filter is a second digital filter.

32. The system for surge detection within a gas turbine engine according to claim 29, wherein the first filter is a first analog filter and the second filter is a second analog filter.

* * * * *